United States Patent
Lu et al.

(10) Patent No.: US 9,535,558 B2
(45) Date of Patent: Jan. 3, 2017

(54) INTEGRATED ELECTROMAGNETIC AND CAPACITIVE TOUCH SUBSTRATE, TOUCH PANEL, AND TOUCH DISPLAY PANEL

(71) Applicants: Shanghai Tianma Micro-Electronics Co., Ltd., Shanghai (CN); Tianma Micro-Electronics Co., Ltd., Shenzhen (CN)

(72) Inventors: Feng Lu, Shanghai (CN); Qijun Yao, Shanghai (CN); Xianxiang Zhang, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 96 days.

(21) Appl. No.: 14/645,412

(22) Filed: Mar. 11, 2015

(65) Prior Publication Data

US 2016/0124562 A1 May 5, 2016

(30) Foreign Application Priority Data

Oct. 30, 2014 (CN) .......................... 2014 1 0603185

(51) Int. Cl.
| | | |
|---|---|---|
| G06F 3/045 | (2006.01) | |
| G06F 3/046 | (2006.01) | |
| G06F 3/041 | (2006.01) | |
| G06F 3/044 | (2006.01) | |

(52) U.S. Cl.
CPC ............... G06F 3/046 (2013.01); G06F 3/044 (2013.01); G06F 3/0412 (2013.01); G06F 2203/04106 (2013.01)

(58) Field of Classification Search
CPC .......... G06F 3/041; G06F 3/044; G06F 3/046; G06F 2203/04104; G06F 2203/04106; G02F 1/13338; G02F 1/1343
See application file for complete search history.

(56) References Cited

U.S. PATENT DOCUMENTS

| | | | |
|---|---|---|---|
| 2004/0189587 A1* | 9/2004 | Jung ................... | G02F 1/13338 345/102 |
| 2010/0144391 A1 | 6/2010 | Chang et al. | |
| 2010/0328249 A1* | 12/2010 | Ningrat ................... | G06F 3/046 345/174 |

(Continued)

FOREIGN PATENT DOCUMENTS

| | | |
|---|---|---|
| CN | 203616742 U | 5/2014 |
| CN | 103941939 A | 7/2014 |

(Continued)

*Primary Examiner* — Joe H Cheng
(74) *Attorney, Agent, or Firm* — Anova Law Group, PLLC

(57) ABSTRACT

An embodiment discloses an integrated electromagnetic and capacitive touch substrate, and a touch display panel. The touch substrate includes: a substrate; and a plurality of driving electrodes, a plurality of sensing electrodes, and a plurality of first coils, arranged on the substrate in the same layer, wherein the plurality of driving electrodes and sensing electrodes are arranged alternately in a first direction; and the plurality of first coils are arranged in the first direction, and each of the first coils surrounds at least one of the driving electrodes and/or the sensing electrodes.

20 Claims, 5 Drawing Sheets

(56) References Cited

U.S. PATENT DOCUMENTS

| | | | |
|---|---|---|---|
| 2011/0069022 A1* | 3/2011 | Yokota | G06F 3/0416 345/173 |
| 2011/0227588 A1* | 9/2011 | Chen | G06F 3/044 324/654 |
| 2011/0298748 A1* | 12/2011 | Chen | G06F 3/044 345/174 |
| 2013/0155005 A1* | 6/2013 | Liang | G06F 3/046 345/174 |
| 2014/0002413 A1* | 1/2014 | Kim | G06F 3/0416 345/174 |
| 2014/0071083 A1 | 3/2014 | Yoo et al. | |
| 2015/0002453 A1* | 1/2015 | Lu | G06F 3/0416 345/174 |
| 2015/0042604 A1* | 2/2015 | Lu | G06F 3/044 345/174 |
| 2015/0091849 A1* | 4/2015 | Ludden | G06F 3/0412 345/174 |
| 2015/0091856 A1* | 4/2015 | Park | G06F 3/0416 345/174 |
| 2015/0370388 A1* | 12/2015 | Choi | G06F 3/047 345/173 |
| 2016/0154511 A1* | 6/2016 | Yao | G06F 3/0412 345/174 |

FOREIGN PATENT DOCUMENTS

| | | |
|---|---|---|
| CN | 103941946 A | 7/2014 |
| CN | 104049814 A | 9/2014 |

\* cited by examiner

INTEGRATED ELECTROMAGNETIC AND CAPACITIVE TOUCH SUBSTRATE, TOUCH PANEL, AND TOUCH DISPLAY PANEL

CROSS-REFERENCES TO RELATED APPLICATIONS

This application claims the benefit of priority to Chinese Patent Application No. 201410603185.5, filed with the Chinese Patent Office on Oct. 30, 2014 and entitled "INTEGRATED ELECTROMAGNETIC AND CAPACITIVE TOUCH SUBSTRATE, TOUCH PANEL, AND TOUCH DISPLAY PANEL", the content of which is incorporated herein by reference in its entirety.

FIELD OF THE INVENTION

The present invention relates to the field of touch panels, and more particularly to an integrated electromagnetic and capacitive touch substrate, a touch display panel, and a touch display device.

BACKGROUND OF THE INVENTION

In recent years, touch technology has been widely used in various electronic products in our daily work and life. A user can touch a touch panel directly with his or her finger or another object to input information thereto so as to alleviate and even eliminate a dependency of the user upon another input device (e.g., a keyboard, a mouse, a remote controller, etc.), thus facilitating an operation by the user.

Touch panels include electromagnetic touch panels, capacitive touch panels, resistive touch panels, etc. With an electromagnetic touch panel, a varying magnetic field is generated by a coil on a special electromagnetic stylus. An electromagnetic inductive coil on the touch panel induces the varying magnetic field and generates a weak current. A touch coordinate can be calculated from the weak current. With a capacitive touch panel, a varying capacitance of a configured sensing capacitor is incurred by the user's touch on the touch panel, thus the touch coordinates are calculated from the varying capacitance The integration of an electromagnetic touch structure and a capacitive touch structure together into an integrated electromagnetic and capacitive touch panel with both the electromagnetic touch function and the capacitive touch function has been a significant issue in the research and development of touch control technology. The electromagnetic touch structure and the capacitive touch structure in the integrated electromagnetic and capacitive touch panel in the prior art are prepared separately, resulting in complexity of the structure and the process thereof.

BRIEF SUMMARY OF THE INVENTION

An embodiment of the disclosure discloses an integrated electromagnetic and capacitive touch substrate including:
  a substrate; and
  a plurality of driving electrodes, a plurality of sensing electrodes, and a plurality of first coils, arranged on the substrate in the same layer, wherein the plurality of driving electrodes and sensing electrodes are arranged alternately in a first direction; and the plurality of first coils are arranged in the first direction, and each of the first coils surrounds at least one of the driving electrodes and/or the sensing electrodes.

An embodiment of the disclosure discloses a touch panel including the integrated electromagnetic and capacitive touch substrate above, a first driving detection circuit, and a second driving detection circuit, wherein:
  for a capacitive touch, the first driving detection circuit applies a capacitive driving signal to the driving electrodes and detects a capacitive sensing signal from the sensing electrodes, and the first coils are grounded or floating; and
  for an electromagnetic touch, the second driving detection circuit applies an electromagnetic driving signal to the first coils and detects an electromagnetic inductive signal from the first coils to thereby detect a coordinate in the first direction.

An embodiment of the disclosure discloses a touch display panel including the integrated electromagnetic and capacitive touch substrate above.

DETAILED DESCRIPTION OF THE INVENTION

Figure 1:
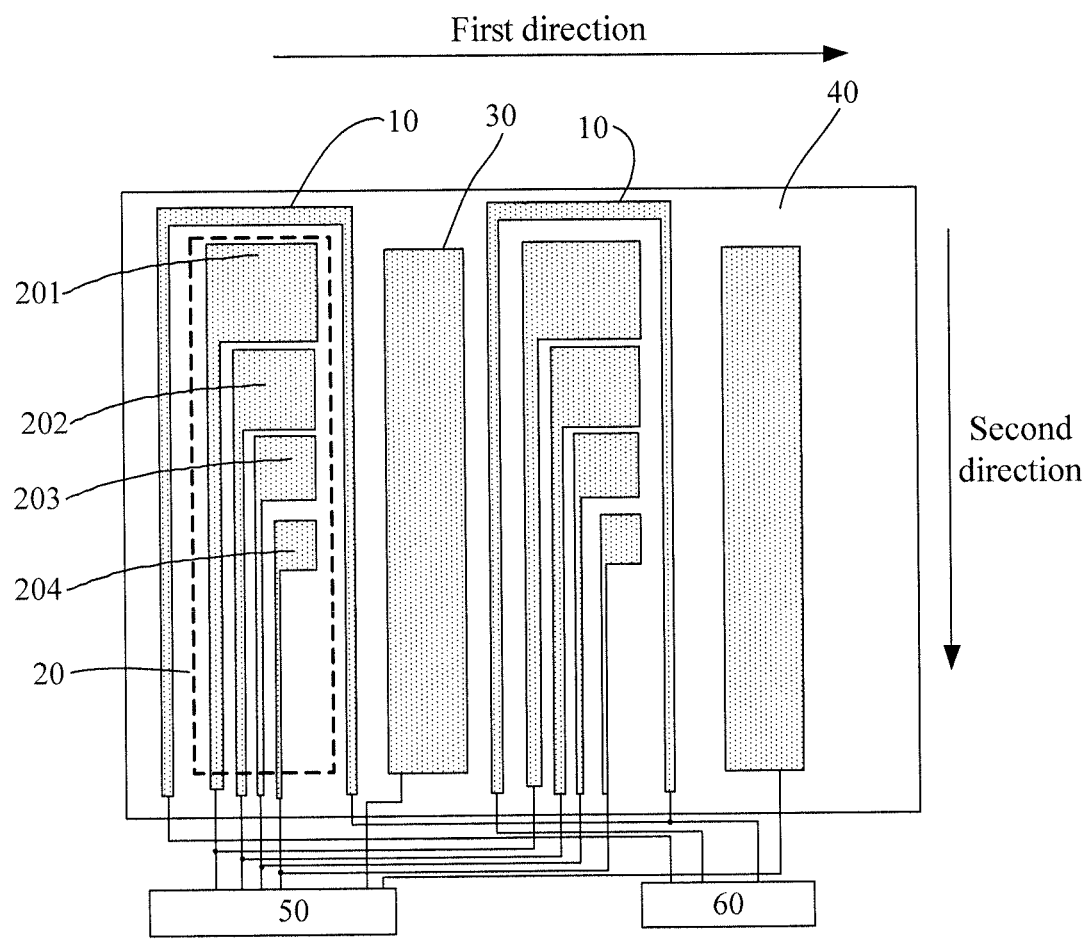
FIG. 1 illustrates a schematic structural diagram of an integrated electromagnetic and capacitive touch substrate according to an embodiment of the present invention.

Implementations of the embodiments of the invention will be described below in details with reference to the drawings. It shall be noted that identical or similar reference numerals will denote identical or similar elements or functionally identical or similar elements throughout the drawings. The embodiments described below with reference to the drawings are illustrative and merely intended to explain the invention but shall not be construed as limiting the invention.

Referring to FIG. 1, which illustrates a schematic structural diagram of an integrated electromagnetic and capacitive touch substrate according to an embodiment of the present invention. For the sake of convenient understanding of the embodiment, the direction in which the substrate is placed in FIG. 1 is a reference direction, and a first direction is the horizontal direction, and a second direction is the vertical direction.

In an embodiment, an integrated electromagnetic and capacitive touch substrate includes: a substrate 40, a plurality of driving electrodes 20, a plurality of sensing electrodes 30, and a plurality of first coils 10. The plurality of driving electrodes 20, the plurality of sensing electrodes 30, and the plurality of first coils 10 are arranged on the substrate 40 at the same layer. The plurality of driving electrodes 20 and the plurality of sensing electrodes 30 are arranged alternately in the first direction; and the plurality of first coils 10 are arranged in the first direction, and each of the plurality of first coils 10 surrounds at least one of the plurality of driving electrodes 20 and/or the plurality of sensing electrodes 30. It shall be noted that the concept of "A and/or B" in this context refers to A, or B, or A and B, for example, "the plurality of driving electrodes 20 and/or the plurality of sensing electrodes 30" refers to the plurality of driving electrodes 20, or the plurality of sensing electrodes 30, or the plurality of driving electrodes 20 and the plurality of sensing electrodes 30.

An operating process of the integrated electromagnetic and capacitive touch substrate shown in FIG. 1 includes capacitive touch process and electromagnetic touch process.

The capacitive touch process is performed as below. The plurality of first coils 10 are grounded or floating, here floating means that no signal is applied to the plurality of first coils 10. A capacitive driving signal is applied to the plurality of driving electrodes 20. A capacitive sensing signal is detected from the plurality of sensing electrodes 30. The coordinates in the first direction and the second direction on the substrate 40 can be derived from the capacitive sensing signal.

The electromagnetic touch process is performed as below. The plurality of driving electrodes 20 can be grounded or floating. The plurality of sensing electrodes 30 can be grounded or floating. The plurality of first coils 10 generate an inductive signal by sensing an external electromagnetic signal (typically originating from an electromagnetic stylus). A touch of an electromagnetic stylus can be detected. As can be apparent from the description above, the plurality of driving electrodes 20, the plurality of sensing electrodes 30, and the plurality of first coils 10 arranged on the substrate 40 can perform the electromagnetic touch process and the capacitive touch process. The plurality of driving electrodes 20, the plurality of sensing electrodes 30, and the plurality of first coils 10 on the substrate 40 can be structured simply and arranged conveniently. A structure of the integrated electromagnetic and capacitive touch substrate can be greatly simplified thereby and a cost of manufacturing the integrated electromagnetic and capacitive touch substrate can be lowered.

Figure 2:
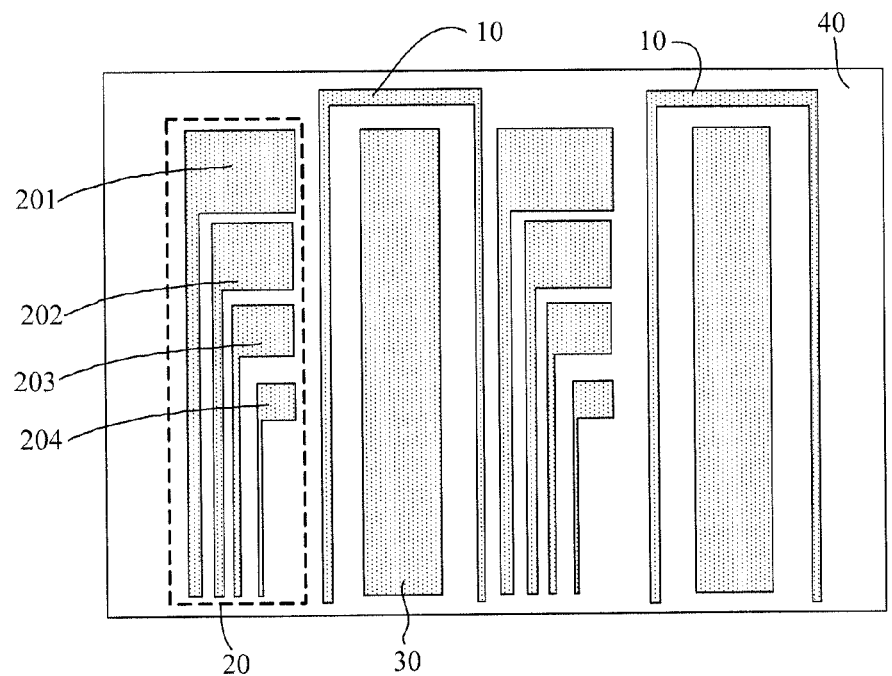
FIG. 2 illustrates another schematic structural diagram of an integrated electromagnetic and capacitive touch substrate according to an embodiment of the present invention.
Figure 3:
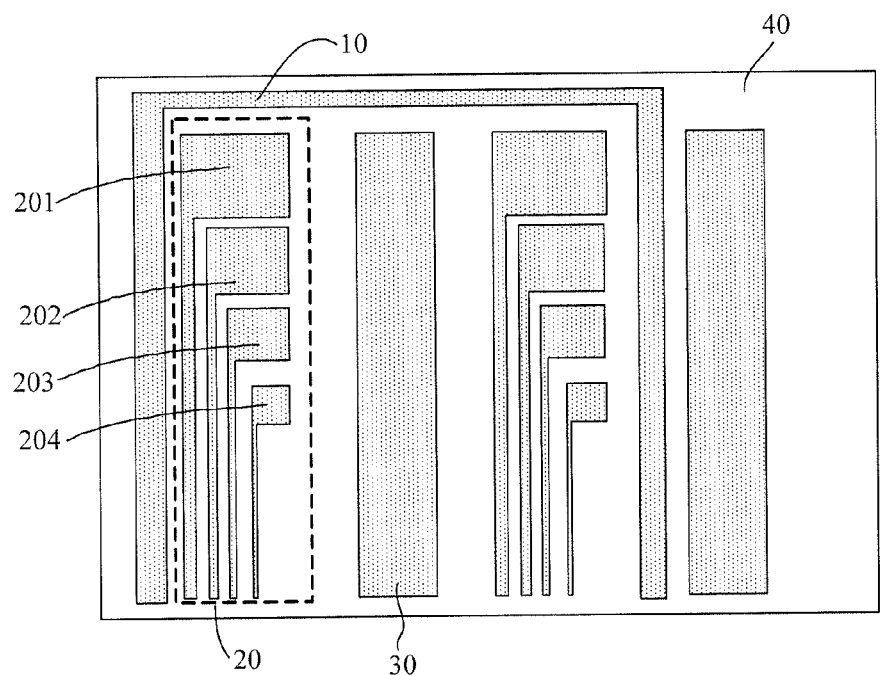
FIG. 3 illustrates another schematic structural diagram of an integrated electromagnetic and capacitive touch substrate according to an embodiment of the present invention.

Each of the plurality of first coils 10 can be structured in the U-shape, and the plurality of first coils 10 can be arranged variously. Each of the plurality of first coils 10 can surround one of the plurality of driving electrodes 20 as illustrated in FIG. 1. Each of the plurality of first coils 10 can surround one of the plurality of sensing electrodes 30 as illustrated in FIG. 2. Each of the plurality of first coils 10 can surround more than one of the plurality of driving electrodes 20 and the plurality of sensing electrodes 30 as illustrated in FIG. 3. The integrated electromagnetic and capacitive touch substrates illustrated in FIG. 1, FIG. 2 and FIG. 3 are performed with different resolution in electromagnetic touch process. The density (the number of coils per unit area)of the plurality of first coils 10 shown in FIG. 1 and FIG. 2 is higher than the density of the plurality of first coils 10 shown in FIG. 3. There is a higher resolution of the integrated electromagnetic and capacitive touch substrate as illustrated in FIG. 1 and FIG. 2.

In each of FIG. 1, FIG. 2 and FIG. 3, the plurality of driving electrodes 20, the plurality of sensing electrodes 30 and the plurality of first coils 10 are arranged in the first direction, the plurality of sensing electrodes 30 are structured as strip-shaped electrodes, and each of the plurality of driving electrodes 20 includes a plurality of sub-driving electrodes 201, 202, 203 and 204. The plurality of sub-driving electrodes 201, 202, 203 and 204 are arranged in the second direction. In operation, as illustrated in FIG. 1, the capacitive touch process is performed as below. A first driving detection circuit 50 applies a capacitive driving signal to the plurality of driving electrodes 20. The plurality of first coils 10 can be grounded or floating. The first driving detection circuit 50 can apply the capacitive driving signal sequentially to the sub-driving electrodes 201, 202, 203 and 204 in each of the plurality of driving electrodes 20. All the sub-driving electrodes 201 can be connected electrically. All the sub-driving electrodes 202 can be connected electrically. All the sub-driving electrodes 203 can be connected electrically. All the sub-driving electrodes 204 can be connected electrically. A capacitance can be formed between one of the sub-driving electrodes and one of the plurality of sensing electrodes 30. A capacitive sensing signal can be received and detected from the plurality of sensing electrodes 30. The coordinate of a touch position in the first direction can be determined by analyzing the capacitive sensing signal detected from the plurality of sensing electrodes 30, and the coordinate of the touch position in the second direction can be determined from the time when the capacitive driving signal is applied to a respective one of the sub-driving electrodes 201, 202, 203 and 204.

The electromagnetic touch process can be performed as below. The plurality of driving electrodes 20 are grounded or floating. The plurality of sensing electrodes 30 are grounded or floating. The plurality of first coils 10 are inducted by an electromagnetic signal to generate an electromagnetic inductive signal. The electromagnetic signal can be emitted by an external electromagnetic stylus (not illustrated). A second driving detection circuit 60 detects the electromagnetic inductive signal from the plurality of first coils 10 to thereby determine the coordinate of the touch position in the first direction. The external electromagnetic stylus can be an active electromagnetic stylus. In an electromagnetic touch process using an active electromagnetic stylus, the electromagnetic stylus emits an electromagnetic signal, the plurality of first coils 10 are inducted by the electromagnetic signal emitted by the electromagnetic stylus to generate the electromagnetic inductive signal, and the second driving detection circuit 60 detects the electromagnetic inductive signal from the plurality of first coils 10 to thereby determine the coordinate of the touch position in the first direction. The external electromagnetic stylus can alternatively be a passive electromagnetic stylus. In an electromagnetic touch process using a passive electromagnetic stylus, the second driving detection circuit 60 applies an electromagnetic driving signal to the plurality of first coils 10 one by one and detects the electromagnetic inductive signal to determine the coordinate of the touch position in the first direction. The process of the second driving detection circuit 60 applying an electromagnetic driving signal to the plurality of first coils 10 one by one can be described as below. The second driving detection circuit 60 applies the electromagnetic driving signal to one of the plurality of first coils 10 so that the one of the plurality of first coils 10 emit an electromagnetic signal, and an oscillating circuit in the external passive electromagnetic stylus (not illustrated) is inducted by the electromagnetic signal emitted by the one of the plurality of first coils 10, and resonates to generate an electromagnetic signal (referred to a reflective electromagnetic signal). The one of plurality of first coils 10 receives the reflective electromagnetic signal and generates the electromagnetic inductive signal. The second driving detection circuit 60 detects the electromagnetic inductive signal from the one of plurality of first coils 10 to thereby determine the coordinate of the touch position in the first direction. The electromagnetic and capacitive integrated touch substrate illustrated in FIG. 1 can detect the coordinate in the first direction but not the coordinate in the second direction.

Figure 4:
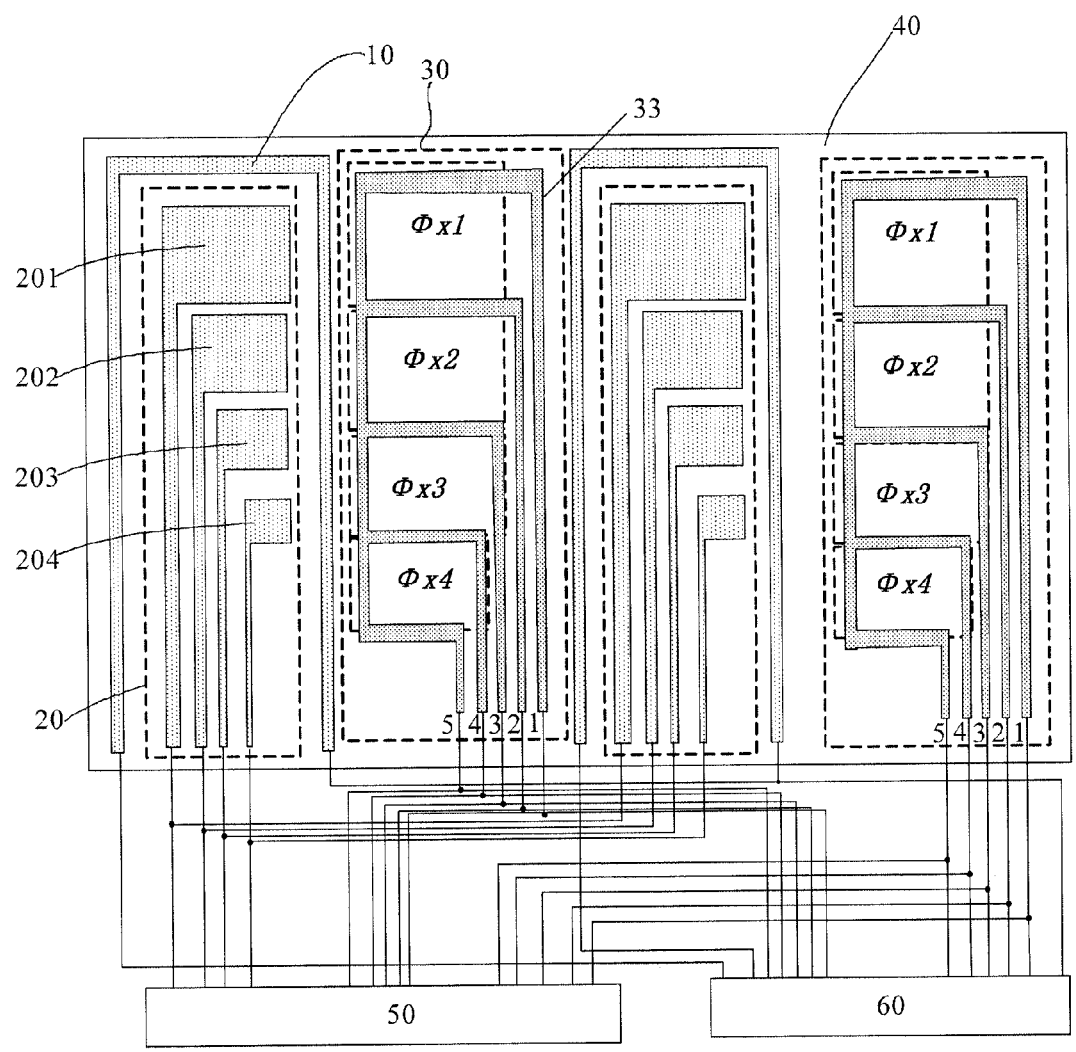
FIG. 4 illustrates a schematic structural diagram of an inductive electrode on an integrated electromagnetic and capacitive touch substrate according to an embodiment of the present invention.
Figure 5:
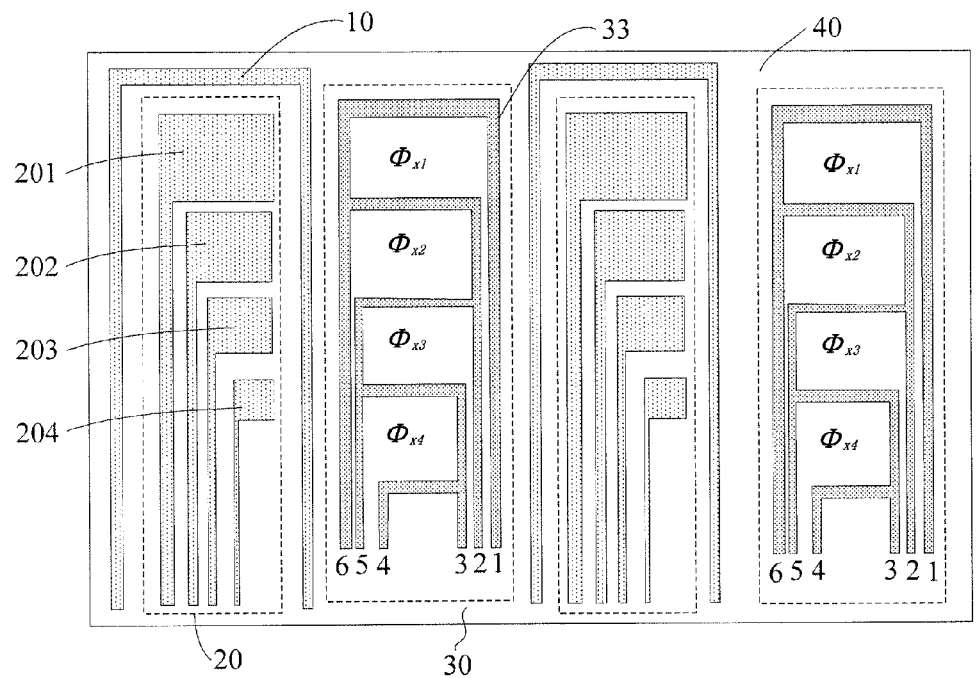
FIG. 5 illustrates another schematic structural diagram of an inductive electrode on an integrated electromagnetic and capacitive touch substrate according to an embodiment of the present invention.

For detecting the coordinate in the second direction, the sensing electrodes 30 can be structured to include a plurality of sub-inductive coils arranged in the second direction as illustrated in FIG. 4 and FIG. 5. Each of the plurality of first coils 10 surrounds one of the plurality of driving electrodes 20. Each of the plurality of driving electrodes 20 includes four sub-driving electrodes 201, 202, 203 and 204. Each of the plurality of sensing electrodes 30 includes four sub-inductive coils Φx1, Φx2, Φx3 and Φx4. The sub-inductive coils Φx1, Φ2, Φ3 and Φ4 are sequentially arranged from the top to the bottom in FIG. 4. The electromagnetic touch process can be performed as below. The sub-driving electrodes 201, 202, 203 and 204 in each of the plurality of the driving electrodes 20 are floating or grounded. The plurality of first coils 10 are inducted by an external electromagnetic signal (typically originating from an electromagnetic stylus) to generate an electromagnetic inductive signal. The second driving detection circuit 60 detects the electromagnetic inductive signal from the plurality of first coils 10 to thereby determine the coordinate of the touch position in the first direction. The sub-inductive coils Φx1, Φ2, Φx3 and Φx4 are inducted by an external electromagnetic signal (typically originating from an electromagnetic stylus) to generate an electromagnetic inductive signal, and the second driving detection circuit 60 detects the electromagnetic inductive signal from the sub-inductive coils Φx1, Φx2, Φx3 and Φx4 to thereby determine the coordinate of the touch position in the second direction. Then the touch position in two dimensions can be determined in the electromagnetic touch process.

The capacitive touch process can be performed as below the plurality of first coils 10 are grounded or floating. The first driving detection circuit 50 transmits a driving signal sequentially to each of the sub-driving electrodes 201, 202, 203 and 204 of the plurality of driving electrodes 20. The sub-inductive coils Φx1, Φx2, Φx3 and Φx4 in each of the plurality of sensing electrodes 30 are electrically connected together and output a capacitive sensing signal. The first driving detection circuit 50 detects and analyzes the capacitive sensing signal from the plurality of the sensing electrodes 30 to thereby determine the coordinate of the touch position in the first direction. The first driving detection circuit 50 determines the coordinate of the touch position in the second direction from the time when the capacitive driving signal is applied to the sub-driving electrodes 201, 202, 203 and 204. Then the touch position in two dimensions can be determined in the capacitive touch process.

The sensing electrodes 30 including sub-inductive coils Φx1, Φx2, Φx3 and Φx4 can be structured with different patterns. The areas of the plurality of sub-inductive coils Φx1, Φx2, Φx3 and Φx4 can be uniform or can be decremented or incremented in a preset direction. The sub-inductive coils Φx1, Φx2, Φx3 and Φx4 are structured with their areas being decremented from the top to the bottom in the second direction showed in FIG. 4 and FIG. 5.

A Pattern of the Sensing Electrodes 30

FIG. 4 illustrates a structure of the sub-inductive coils Φx1, Φx2, Φx3 and Φx4 of the sensing electrodes 30. Each of the plurality of the sensing electrodes 30 includes the plurality of sub-inductive coils Φx1, Φx2, Φx3 and Φx4 arranged in the second direction. There is a same wiring manner for the plurality of sub-inductive coils Φx1, Φx2, Φx3 and Φx4. Wiring of each of the sub-inductive coils in one of the plurality of sensing electrodes 30 extends out from the same side of the one of the plurality of sensing electrodes 30. The sub-inductive coil Φx1 as illustrated in FIG. 4 includes the structure indicated by dotted lines, and wiring 33 located on a side thereof.

Each of the sub-inductive coils Φx1, Φx2, Φx3 and Φx4 can be a U-shaped sub-inductive coil with both ends extending out respectively through the wiring 33. Each of the four sub-inductive coils Φx1, Φx2, Φx3 and Φx4 extends out through two wirings. The four sub-inductive coils Φx1, Φx2, Φx3 and Φx4 all extend out in the same direction. A terminal of the wiring 33 can be arranged at the lower edge of the substrate 40 illustrated in FIG. 4.

A wiring between two adjacent ones of the four sub-inductive coils Φx1, Φx2, Φx3 and Φx4 can be common to the two adjacent ones. In FIG. 4, five wirings in total are sufficient for the four sub-inductive coils. The electromagnetic touch process can be performed in such a way below. The four sub-inductive coils Φx1, Φx2, Φx3 and Φx4 can be controlled to be driven in a time-division manner. In this way, an interference cannot occur in the wiring common to the two adjacent sub-inductive coils. As illustrated in FIG. 4, the wirings of Φx1, Φx2, Φx3 and Φx4 are first wiring 1, second wiring 2, third wiring 3, fourth wiring 4, and fifth wiring 5 respectively. Φx1, Φx2, Φx3 and Φx4 are detected in a time-division manner in electromagnetic touch detection. Φx1 can be detected in such a manner that the second driving detection circuit 60 applies a ground potential to one of the first wiring 1 and the second wiring 2 and applies an electromagnetic driving signal to another one of the first wiring 1 and the second wiring 2, and the third wiring 3, the fourth wiring 4, the fifth wiring 5, and the sixth wiring 6 are floating. Similarly, for Φx2, the second driving detection circuit 60 applies a ground potential to one of the second wiring 2 and the third wiring 3 and applies an electromagnetic driving signal to another one of the second wiring 2 and the third wiring 3, and the remaining wirings are floating. For Φx3, the second driving detection circuit 60 applies a ground potential to one of the third wiring 3 and the fourth wiring 4 and applies an electromagnetic driving signal to another one of the third wiring 3 and the fourth wiring 4, and the remaining wirings are floating). For Φx4, the second driving detection circuit 60 applies a ground potential to one of the fourth wiring 4 and the fifth wiring 5 and applies an electromagnetic driving signal respectively to the fourth wiring 4 and the fifth wiring 5, and the remaining wirings are floating.

Another Pattern of the Sensing Electrodes 30

FIG. 5 illustrates another structure of the sensing electrodes 30. Each of the plurality of sensing electrodes 30 includes the plurality of sub-inductive coils Φx1, Φx2, Φx3 and Φx4 arranged in the second direction. Wirings of adjacent ones of the plurality of sub-inductive coils can be arranged opposite. Wirings of the plurality of sub-inductive coils Φx1, Φ2, Φx3 and Φx4 in each of the plurality of sensing electrodes 30 can be grouped into two sets. The two sets of wirings extend out respectively from two sides of each of the plurality of sensing electrodes 30.

Each of the sub-inductive coils Φx1, Φx2, Φx3 and Φx4 can be a U-shaped sub-inductive coil with both terminals extending out respectively through the wiring. Each of the sub-inductive coils Φx1, Φx2, Φx3 and Φx4 extends out through two wirings, and the four sub-inductive coils Φx1, Φx2, Φx3 and Φx4 are configured that wirings of any adjacent two sub-inductive coils extend along opposite sides of each of the plurality of sensing electrodes 30. The wirings of Φx1 and Φx2 are opposite, the wirings of Φx2 and Φx3 are opposite, and the wirings of Φx3 and Φx4 are opposite. The wirings of the four sub-inductive coils are arranged alternately.

A wiring between two adjacent ones of the four sub-inductive coils Φx1, Φx2, Φx3 and Φx4 can be common to the two adjacent ones. In FIG. 5, six wirings in total are sufficient for Φx1, Φx2, Φx3 and Φx4, Φx1, Φx2, Φx3 and Φx4 can be controlled to be driven in a time-division manner. In this way, an interference cannot occur in the wiring common to the two adjacent sub-inductive coils. As illustrated in FIG. 5, the wirings of Φx1, Φx2, Φx3 and Φx4 are first wiring 1, second wiring 2, third wiring 3, fourth wiring 4, fifth wiring 5, and sixth wiring 6 respectively. Φx1, Φx2, Φx3 and Φx4 are detected in a time-division manner in electromagnetic touch detection. Φx1 can be detected in such a manner that the second driving detection circuit 60 applies a ground potential to one of the first wiring 1 and the second wiring 2 and applies an electromagnetic driving signal to another one of the first wiring 1 and the second wiring 2, and the third wiring 3, the fourth wiring 4, the fifth wiring 5, and the sixth wiring 6 are floating. Similarly, for Φx2, the second driving detection circuit 60 applies a ground potential to one of the fifth wiring 5 and the sixth wiring 6 and applies an electromagnetic driving signal to another one of the fifth wiring 5 and the sixth wiring 6, and the remaining wirings are floating. For Φx3, the second driving detection circuit 60 applies a ground potential to one of the second wiring 2 and the third wiring 3 and applies an electromagnetic driving signal to another one of the second wiring 2 and the third wiring 3, and the remaining wirings are floating). For Φx4, the second driving detection circuit 60 applies a ground potential to one of the fourth wiring 4 and the fifth wiring 5 and applies an electromagnetic driving signal to another one of the fourth wiring 4 and the fifth wiring 5, and the remaining wirings are floating.

It shall be appreciated that the number of sub-driving electrodes in each of the plurality of driving electrodes 20 and the number of sub-inductive coils in each of the plurality of sensing electrodes 30 cannot be the same as illustrated in FIG. 4 and FIG. 5.

Furthermore for the sake of convenient calculation of the coordinates, the plurality of driving electrodes 20 and the plurality of sensing electrodes 30 can be arranged spaced at equal intervals in the first direction.

Another Pattern of the Sensing Electrodes 30

Figure 6:
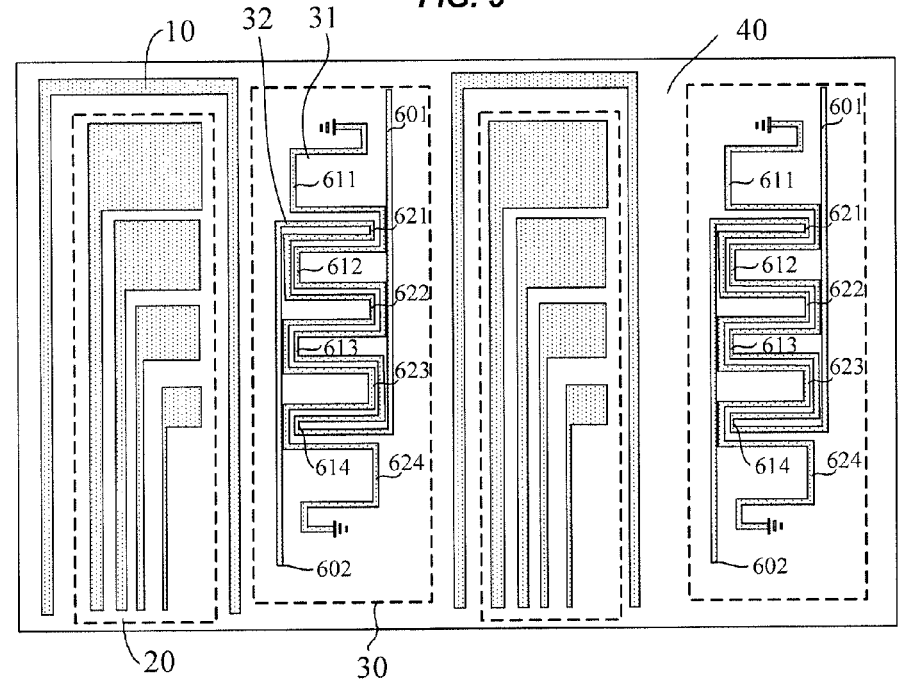
FIG. 6 illustrates another schematic structural diagram of an inductive electrode on an integrated electromagnetic and capacitive touch substrate according to an embodiment of the present invention.

Each of the plurality of sensing electrodes 30 can include a first inductive coil 31 and a second inductive coil 32. Terminals of the first inductive coil 31 and terminals of the second inductive coil 32 are arranged opposite. As illustrated in FIG. 6, the terminal 601 of the first inductive coil 31 and the terminal 602 of the second inductive coil 32 are arranged opposite in location. In FIG. 6, the terminal 601 of the first inductive coil 31 and the terminal 602 of the second inductive coil 32 are arranged respectively on opposite upper and lower terminals of one of the plurality of sensing electrodes 30. The terminal 601 of the first inductive coil 31 and the terminal 602 of the second inductive coil 32 are respectively on upper and lower sides of the substrate 40. The first inductive coil 31 and the second inductive coil 32 are bent respectively into a plurality of sub-inductive coils. The sub-inductive coils of the first inductive coil 31 and the sub-inductive coils of the second inductive coil 32 can be nested alternately into each other.

As illustrated in FIG. 6, the first inductive coil 31 is bended into four sub-inductive coils which are a first sub-inductive coil 611, a second sub-inductive coil 612, a third sub-inductive coil 613, and a fourth sub-inductive coil 614 respectively. The second inductive coil 32 is bended into four sub-inductive coils which are a first sub-inductive coil 621, a second sub-inductive coil 622, a third sub-inductive coil 623, and a fourth sub-inductive coil 624 respectively. The sub-inductive coils are nested alternately into each other in such a way below. The first sub-inductive coil 621 of the second inductive coil 32 is nested between the first sub-inductive coil 611 and the second sub-inductive coil 612 of the first inductive coil 31, and the other sub-inductive coils of the second inductive coil 32 are nested sequentially between two adjacent sub-inductive coils of the first inductive coil 31. The areas of the sub-inductive coils of the first inductive coil 31 are decremented sequentially from the first sub-inductive coil 611 to the fourth sub-inductive coil 614. The areas of the sub-inductive coils of the second inductive coil 32 are incremented sequentially from the first sub-inductive coil 621 to the fourth sub-inductive coil 624. In operation, an induced current can be generated in the sub-inductive coils by receiving and sensing a electromagnetic signal. Since the area of the first sub-inductive coil 611 of the first inductive coil 31 is larger than the area of the first sub-inductive coil 621 of the second inductive coil 32, an induced current generated in the first sub-inductive coil 611 of the first inductive coil 31 is different from an induced current generated in the first sub-inductive coil 621 of the second inductive coil 32. The coordinate in the second direction can be determined from the ratio of the magnitudes of the current in the first sub-inductive coil 611 of the first inductive coil 31 and the first sub-inductive coil 621 of the second inductive coil 32. As can be apparent from FIG. 6, the areas of the first sub-inductive coil 611, the second sub-inductive coil 612, the third sub-inductive coil 613, and the fourth sub-inductive coil 614 of the second inductive coil 32 are incremented along the direction from the terminal 601 to the ground. The amplitude of induced current in a sub-inductive coil is in proportion to the area of the sub-inductive coil. The driving detection circuit can determine a sub-inductive coil, touched by a user, from the ratio of the amplitude I1 of first induced current from the first inductive coil 31 to the amplitude I2 of second induced current from the second inductive coil 32. A touched sub-inductive coil can be determined by comparing $(I1-I2)/(I1+I2)$ with a predetermined threshold value.

A touch panel can include an integrated electromagnetic and capacitive touch substrate, the first driving detection circuit 50, and the second driving detection circuit 60. The integrated electromagnetic and capacitive touch substrate can be the structure shown in FIG. 1 to FIG. 6.

A capacitive touch process can be performed as below. The first driving detection circuit 50 applies a capacitive driving signal to the plurality of driving electrodes 20 and detects a capacitive sensing signal from the plurality of sensing electrodes 30, and the plurality of first coils 10 are grounded or floating.

An electromagnetic touch process can be performed as below. The second driving detection circuit 60 applies an electromagnetic driving signal to the plurality of first coils 10 and detects an electromagnetic inductive signal from the plurality of first coils 10. Thereby, the coordinate in the first direction can be determined.

A touch panel can be operated with a capacitive touch process and an electromagnetic touch process as below. The capacitive touch process can be performed as below. The first driving detection circuit 50 applies a capacitive driving signal to the plurality of driving electrodes 20. The plurality of first coils 10 are grounded or floating. The first driving detection circuit 50 applies the capacitive driving signal sequentially to respective sub-driving electrodes in each of the plurality of driving electrodes 20 and receives the detected capacitive sensing signal from the plurality of sensing electrodes 30. At this time, all the sub-sensing electrodes in each of the plurality of sensing electrodes 30 are electrically connected together. A coordinate of a touch position in the first direction can be derived from the coordinate in the first direction of a driving electrode 20 including the sub-driving electrode to which the capacitive driving signal is input. A coordinate of the touch position in the second direction can be derived from the coordinate in the second direction of a sensing electrode 30 from which the capacitive sensing signal is detected. The electromagnetic touch process can be performed as below. The plurality of driving electrodes 20 are grounded or floating. When an active electromagnetic stylus is used, the second driving detection circuit 60 detects an electromagnetic inductive signal from the plurality of first coils 10 and a coordinate of a touch position in the first direction can be determined. The second driving detection circuit 60 detects an electromagnetic inductive signal from the plurality of sub-inductive coils and a coordinate of the touch position in the second direction can be determined. When a passive electromagnetic stylus is used, the second driving detection circuit 60 sequentially performs a process including applying an electromagnetic driving signal to the plurality of first coils 10 and detecting an electromagnetic inductive signal from the plurality of first coils 10 and then a coordinate of the touch location in the first direction can be determined. The second driving detection circuit 60 sequentially performs a process including applying an electromagnetic driving signal to the plurality sub-inductive coils and detecting an electromagnetic inductive signal from the plurality sub-inductive coils, and then a coordinate of the touch location in the second direction can be determined. The plurality of driving electrodes 20, the plurality of sensing electrodes 30 (each of which include a plurality of sub-inductive electrodes), and the first coils 10 can be arranged on the substrate 40 to perform an electromagnetic touch process and a capacitive touch process. The components formed on the substrate 40 can be structured simply and arranged conveniently to thereby greatly simplify the structure of the integrated electromagnetic and capacitive touch substrate and hence lower a cost of manufacturing the integrated electromagnetic and capacitive touch substrate.

As described above, a capacitive touch process can be performed in such a way that the plurality of first coils are grounded and at this time a capacitive driving signal is applied to the driving electrodes, and a capacitive sensing signal is detected from the sensing electrodes. Then a coordinate of a touch position in the first direction on the substrate can be derived from the sensing signal of the plurality of sensing electrodes. An electromagnetic touch process can be performed in such a way that the plurality of driving electrodes are grounded or floating, and the first coils generate an inductive signal by sensing an external electromagnetic signal. Then a coordinate of a touch position in the first direction on the substrate can be derived from the inductive signal.

Figure 7:
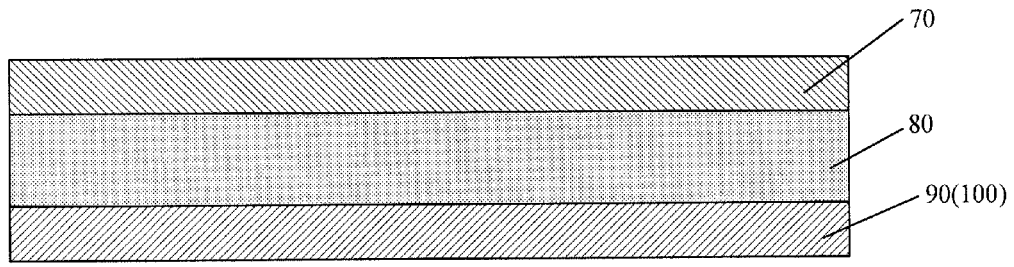
FIG. 7 illustrates a schematic structural diagram of a touch display panel according to an embodiment of the present invention.
Figure 8:
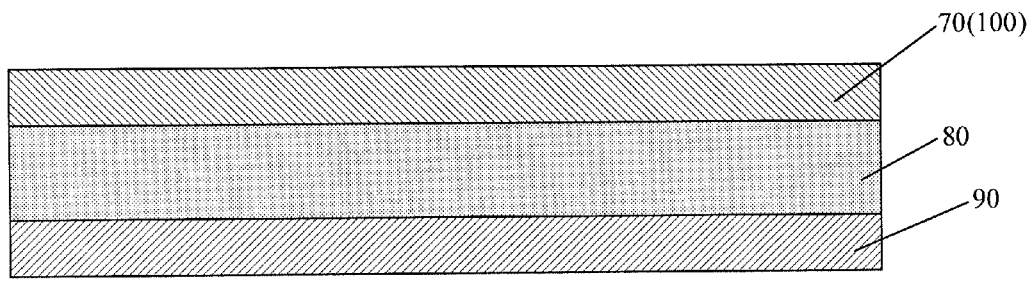
FIG. 8 illustrates another schematic structural diagram of a touch display panel according to an embodiment of the present invention.

As illustrated in FIG. 7 and FIG. 8, a touch display panel can include an integrated electromagnetic and capacitive touch substrate shown in FIG. 1 to FIG. 6.

As illustrated in FIG. 7, an array of pixels can be formed on an integrated electromagnetic and capacitive touch substrate 100. At this time the integrated electromagnetic and capacitive touch substrate 100 can be used as an array substrate 90. The integrated electromagnetic and capacitive touch substrate 100 is arranged to face an opposite substrate 70 for assembly, and a liquid crystal layer 80 is filled between the integrated electromagnetic and capacitive touch substrate 100 and the opposite substrate 70 to form the display panel. In this structure, the plurality of driving electrodes 20, the plurality of sensing electrodes 30 and the plurality of first coils 10 illustrated in FIG. 1 to FIG. 6 are arranged on a side of the integrated electromagnetic and capacitive touch substrate 100 facing the opposite substrate 70.

As illustrated in FIG. 8, a color filter layer can be arranged on or over the integrated electromagnetic and capacitive touch substrate 100. The touch display panel further includes an array substrate 90 arranged to face the integrated electromagnetic and capacitive touch substrate 100. At this time the integrated electromagnetic and capacitive touch substrate 100 can be used as an opposite substrate 70. A black matrix, a color filter layer with three colors, etc. can be formed on or over the integrated electromagnetic and capacitive touch substrate 100 in manufacture. The plurality of driving electrodes 20, the plurality of sensing electrodes 30, and the plurality of first coils 10 can be arranged on a side of the integrated electromagnetic and capacitive touch substrate 100 facing or away from the array substrate 90.

Figure 9:
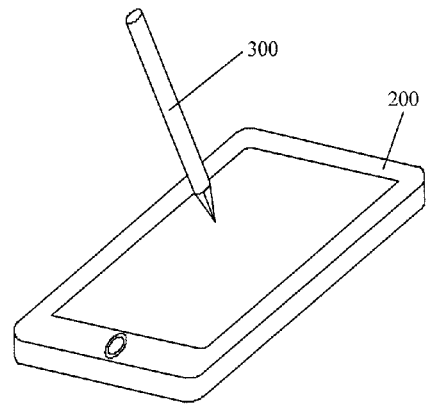
FIG. 9 illustrates a schematic structural diagram of a touch display device according to an embodiment of the present invention.

As illustrated in FIG. 9, a touch display device can include a touch display panel described above.

The touch display device can be a notebook PC, a handset, a tablet PC, etc. FIG. 9 shows a structure of the touch display device which is a tablet PC 200. The touch display device further includes an electromagnetic stylus 300.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. An integrated electromagnetic and capacitive touch substrate, comprising:
    a substrate; and
    a plurality of driving electrodes, a plurality of sensing electrodes, and a plurality of first coils, arranged on the substrate in a same layer;
    wherein the plurality of driving electrodes and the plurality of sensing electrodes are arranged alternately in a first direction; and the plurality of first coils are arranged in the first direction, and each of the first coils surrounds at least one of the plurality of driving electrodes and/or the plurality of sensing electrodes.

2. The integrated electromagnetic and capacitive touch substrate according to claim 1, wherein each of the plurality of driving electrodes comprises a plurality of sub-driving electrodes arranged in a second direction; and each of the plurality of sensing electrodes is a strip-shaped electrode extending in the second direction, or each of the plurality of sensing electrodes comprises a plurality of sub-inductive coils arranged in the second direction.

3. The integrated electromagnetic and capacitive touch substrate according to claim 1, wherein each of the plurality of sensing electrodes comprises a plurality of sub-inductive coils arranged in a second direction, wherein wirings of the sub-inductive coils in a sensing electrode extend out from a same side or opposite sides of the sensing electrode.

4. The integrated electromagnetic and capacitive touch substrate according to claim 3, wherein two adjacent sub-inductive coils in the sensing electrode comprise a common wiring.

5. The integrated electromagnetic and capacitive touch substrate according to claim 1, wherein the plurality of driving electrodes and the plurality of sensing electrodes are arranged spaced in the first direction at equal intervals.

6. The integrated electromagnetic and capacitive touch substrate according to claim 1, wherein each of the plurality of sensing electrodes comprises a first inductive coil having first terminals, and a second inductive coil having second terminals arranged opposite to the first terminals, and the first inductive coil and the second inductive coil each are bent into a plurality of sub-inductive coils so that the sub-inductive coils of the first inductive coil and the sub-inductive coils of the second inductive coil are nested alternately into each other.

7. The integrated electromagnetic and capacitive touch substrate according to claim 6, wherein areas of the sub-inductive coils of the first inductive coil are decremented toward the first terminals of the first inductive coil, and areas of the plurality of sub-inductive coils of the second inductive coil are decremented toward the second terminals of the second inductive coil; or the areas of the sub-inductive coils of the first inductive coil are incremented toward the first terminals of the first inductive coil, and the areas of the plurality of sub-inductive coils of the second inductive coil are incremented toward the second terminals of the second inductive coil.

8. The integrated electromagnetic and capacitive touch substrate according to claim 1, wherein each of the plurality of first coils is a U-shaped coil; and for capacitive touch detection, the plurality of first coils are grounded or floating, and for electromagnetic touch detection, the plurality of first coils are induced by an external electromagnetic signal to generate an inductive signal.

9. A touch panel, comprising the integrated electromagnetic and capacitive touch substrate according to claim 1, a first driving detection circuit, and a second driving detection circuit, wherein:
  for a capacitive touch, the first driving detection circuit applies a capacitive driving signal to the plurality of driving electrodes and detects a capacitive sensing signal from the plurality of sensing electrodes, and the plurality of first coils are grounded or floating; and
  for an electromagnetic touch, the second driving detection circuit applies an electromagnetic driving signal to the plurality of first coils and detects an electromagnetic inductive signal from the plurality of first coils to determine a coordinate in the first direction.

10. The touch panel according to claim 9, wherein each of the plurality of driving electrodes comprises a plurality of sub-driving electrodes arranged in a second direction; and each of the plurality of sensing electrodes is a strip-shaped electrode extending in the second direction, or each of the plurality of sensing electrodes comprises a plurality of sub-inductive coils arranged in the second direction.

11. The touch panel according to claim 9, wherein each of the plurality of sensing electrodes comprises a plurality of sub-inductive coils arranged in a second direction, wherein wirings of the sub-inductive coils in a sensing electrode extend out from a same side or opposite sides of the sensing electrode.

12. The touch panel according to claim 11, wherein two adjacent sub-inductive coils in the sensing electrode comprise a common wiring.

13. The touch panel according to claim 9, wherein the plurality of driving electrodes and the plurality of sensing electrodes are arranged spaced in the first direction at equal intervals.

14. The touch panel according to claim 9, wherein each of the plurality of sensing electrodes comprises a first inductive coil having first terminals, and a second inductive coil having second terminals arranged opposite to the first terminals, and the first inductive coil and the second inductive coil each are bent into a plurality of sub-inductive coils so that the sub-inductive coils of the first inductive coil and the sub-inductive coils of the second inductive coil are nested alternately into each other.

15. The touch panel according to claim 14, wherein areas of the sub-inductive coils of the first inductive coil are decremented toward the first terminals of the first inductive coil, and areas of the plurality of sub-inductive coils of the second inductive coil are decremented toward the second terminals of the second inductive coil; or the areas of the sub-inductive coils of the first inductive coil are incremented toward the first terminals of the first inductive coil, and the areas of the plurality of sub-inductive coils of the second inductive coil are incremented toward the second terminals of the second inductive coil.

16. The touch panel according to claim 9, wherein each of the plurality of first coils is a U-shaped coil; and for capacitive touch detection, the plurality of first coils are grounded or floating, and for electromagnetic touch detection, the plurality of first coils are induced by an external electromagnetic signal to generate an inductive signal.

17. A touch display panel, comprising the integrated electromagnetic and capacitive touch substrate according to claim 1.

18. The touch display panel according to claim 17, further comprising:
  an array of pixels arranged on or above the integrated electromagnetic and capacitive touch substrate;
  an opposite substrate arranged opposite to the integrated electromagnetic and capacitive touch substrate, wherein the plurality of driving electrodes, the plurality of sensing electrodes, and the plurality of first coils are arranged on a side of the integrated electromagnetic and capacitive touch substrate facing the opposite substrate.

19. The touch display panel according to claim 17, further comprising an array substrate arranged opposite to the integrated electromagnetic and capacitive touch substrate.

20. The touch display panel according to claim 19, wherein the plurality of driving electrodes, the plurality of sensing electrodes, and the plurality of first coils on or above the integrated electromagnetic and capacitive touch substrate are arranged on a side of the integrated electromagnetic and capacitive touch substrate facing or away from the array substrate.

* * * * *